US010546338B2

(12) United States Patent
Kang et al.

(10) Patent No.: US 10,546,338 B2
(45) Date of Patent: Jan. 28, 2020

(54) SYSTEM, METHOD AND MEDIUM FOR RECOMMENDING PLACE

(71) Applicant: Samsung Electronics Co., Ltd., Suwon-si (KR)

(72) Inventors: Sang-wook Kang, Anyang-si (KR); Jung-hyun Oh, Seongnam-si (KR); Won-chang Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1128 days.

(21) Appl. No.: 14/336,360

(22) Filed: Jul. 21, 2014

(65) Prior Publication Data

US 2015/0025998 A1 Jan. 22, 2015

(30) Foreign Application Priority Data

Jul. 22, 2013 (KR) ........................ 10-2013-0086274

(51) Int. Cl.
*G06Q 30/00* (2012.01)
*G06Q 30/06* (2012.01)

(52) U.S. Cl.
CPC ................ *G06Q 30/0631* (2013.01)

(58) Field of Classification Search
CPC .................................... G06Q 30/0631
USPC ........................................ 705/26.7
See application file for complete search history.

(56) References Cited

U.S. PATENT DOCUMENTS 8,049,668 B1 * 11/2011 Gines .................... G01S 5/0278
342/465
8,069,169 B2 * 11/2011 Fitzpatrick ....... G06Q 10/06311
707/732
8,184,423 B2 5/2012 Rothkopf
8,190,174 B2 5/2012 Hao et al.
8,340,694 B2 12/2012 Forstall et al.
8,351,910 B2 1/2013 Horodezky et al.
2001/0051935 A1 12/2001 Sugiura
2002/0165751 A1 11/2002 Upadhya
2004/0119600 A1 6/2004 Hampton
2004/0249250 A1 12/2004 McGee et al.
2006/0259924 A1 11/2006 Boortz
2008/0153508 A1 6/2008 Hao et al.

(Continued)

FOREIGN PATENT DOCUMENTS

KR 10-2006-0086638 8/2006
KR 10-2011-0125431 11/2011

(Continued)

OTHER PUBLICATIONS

Location based recommender systems: Architecture, trends and research areas (Year: 2012).*

(Continued)

*Primary Examiner* — Jeffrey A. Smith
*Assistant Examiner* — Lalith M Duraisamygurusamy
(74) *Attorney, Agent, or Firm* — Staas & Halsey LLP

(57) ABSTRACT

A method of receiving a recommendation of Point of Interest (POI) information from a place recommending apparatus is provided. The method includes sending a POI information recommendation request to the place recommending apparatus using sensor data and receiving a recommendation response to the POI information recommendation request from the place recommending apparatus based on user-desired environment information.

24 Claims, 10 Drawing Sheets

(56) References Cited

U.S. PATENT DOCUMENTS

| | | |
|---|---|---|
| 2008/0161027 A1 | 7/2008 | Benco et al. |
| 2008/0228387 A1 | 9/2008 | Yang |
| 2010/0026526 A1 | 2/2010 | Yokota |
| 2010/0073169 A1 | 3/2010 | Needham et al. |
| 2010/0093371 A1 | 4/2010 | Gehrke et al. |
| 2010/0095251 A1 | 4/2010 | Dunko |
| 2010/0136957 A1 | 6/2010 | Horodezky et al. |
| 2010/0271202 A1 | 10/2010 | Lin |
| 2011/0077861 A1 | 3/2011 | Arrasvuori et al. |
| 2011/0087431 A1 | 4/2011 | Gupta et al. |
| 2011/0095916 A1 | 4/2011 | Kass et al. |
| 2011/0105150 A1* | 5/2011 | Moon .................. H04W 4/026 455/456.3 |
| 2011/0313954 A1 | 12/2011 | Zhao et al. |
| 2011/0319051 A1 | 12/2011 | Reitnour |
| 2012/0084349 A1* | 4/2012 | Lee ....................... G06Q 30/02 709/203 |
| 2012/0100867 A1* | 4/2012 | Liang ................ G06Q 30/0255 455/456.1 |
| 2012/0100869 A1 | 4/2012 | Liang et al. |
| 2012/0185419 A1 | 7/2012 | Kuhn et al. |
| 2012/0208564 A1 | 8/2012 | Clark et al. |
| 2012/0225677 A1 | 9/2012 | Forstall et al. |
| 2012/0293341 A1 | 11/2012 | Lin |
| 2012/0306659 A1 | 12/2012 | Ben-Dayan et al. |
| 2012/0315992 A1 | 12/2012 | Gerson et al. |
| 2013/0024203 A1* | 1/2013 | Flores .................... G06Q 30/02 705/1.1 |
| 2013/0137463 A1* | 5/2013 | Busch .................. H04W 4/029 455/456.3 |
| 2013/0267255 A1* | 10/2013 | Liu ....................... H04W 4/029 455/456.3 |
| 2013/0331993 A1* | 12/2013 | Detsch .................. G05B 15/02 700/275 |

FOREIGN PATENT DOCUMENTS

| | | |
|---|---|---|
| KR | 10-2012-0134886 | 12/2012 |
| WO | 02/085008 A1 | 10/2002 |
| WO | 2008/082478 A1 | 7/2008 |

OTHER PUBLICATIONS

Korean Office Action dated Jul. 31, 2019 in Korean Patent Application No. 10-2013-0086274.

* cited by examiner

| SENSOR DATA / ENVIRONMENT DESCRIPTION PHRASE | BRIGHTNESS | NOISE LEVEL | TEMPERATURE | AIR CONDITION |
|---|---|---|---|---|
| BRIGHT | 200lux < x < 500lux | - | - | - |
| SILENT | - | 300dB < x < 400dB | - | - |
| COZY | 100lux < x < 500lux | 30dB < x < 40dB | 23°C < x < 26°C | 30μg/m³ < x < 40μg/m³ |
| SUNNY | 10,000lux < x < 25,000lux | - | - | - |

410 — IS THERE ANY COFFEE SHOP THAT IS BRIGHT AND SILENT?

420 — 📖 silent ☀ bright 🌡 warm 🔔 empty

< USER-DESIRED ENVIRONMENT INFORMATION >

< CONVERTED INTO SENSOR DATA >

SYSTEM, METHOD AND MEDIUM FOR RECOMMENDING PLACE

CROSS-REFERENCE TO RELATED APPLICATIONS

This application claims the priority benefit of Korean Patent Application No. 10-2013-0086274, filed on Jul. 22, 2013, in the Korean Intellectual Property Office, the disclosure of which is incorporated herein in its entirety by reference.

BACKGROUND

1. Field

Embodiments relate to a method and apparatus for recommending a place to a user, and more particularly, to a method and apparatus for collecting environment information regarding vicinities of a particular place by using a sensor and recommending a place to a plurality of terminals by using the collected environment information.

2. Description of the Related Art

A user may obtain environment information related to a place by visiting that place in person or using reviews or pictures provided by others. However, the user may not find out a place having a user-desired environment in real time merely with the reviews or pictures provided by others.

Moreover, the usability of sensors is ever-increasing in association with smart phones and Information Technology (IT). At present, the Internet of things starts in which information made by uniquely identifiable things is shared via the Internet, and a "Bic Data" environment also becomes active, such that the usability of the sensors increases more than ever.

SUMMARY

One or more embodiments include a method and apparatus for collecting environment information regarding vicinities of a particular place by using a sensor of a device and recommending a place to a user by using the collected environment information.

In an aspect of one or more embodiments, there is provided a method of receiving a recommendation of Point of Interest (POI) information from a place recommending apparatus which includes sending a POI information recommendation request to the place recommending apparatus using sensor data and receiving a recommendation response to the POI information recommendation request from the place recommending apparatus based on user-desired environment information.

In an aspect of one or more embodiments, there is provided a method of recommending a place to a device which includes collecting sensor data generated by at least one of a plurality of devices comprising the device, establishing a database for environment information related to a place in which the sensor data is generated, by using the collected sensor data, receiving a Point of Interest (POI) information recommendation request including user-desired environment information from the device, and sending a recommendation response to the POI information recommendation request including a place found based on the user-desired environment information to the device.

In an aspect of one or more embodiments, there is provided a device for receiving a recommendation of Point of Interest (POI) information from a place recommending apparatus which includes a place recommendation requesting unit sending a POI information recommendation request to the place recommending apparatus using sensor data and a recommended place receiving unit receiving a recommendation response to the POI information recommendation request from the place recommending apparatus based on user-desired environment information.

In an aspect of one or more embodiments, there is provided a place recommending apparatus for recommending a place to a device which includes a sensor information collecting unit collecting sensor data generated by at least one of a plurality of devices including the device, a database generating unit establishing a database for environment information related to a place in which the sensor data is generated, by using the collected sensor data, and a place recommending unit receiving a Point of Interest (POI) information recommendation request including user-desired environment information from the device and sending a recommendation response to the POI information recommendation request, which includes a place found based on the user-desired environment information, to the device.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
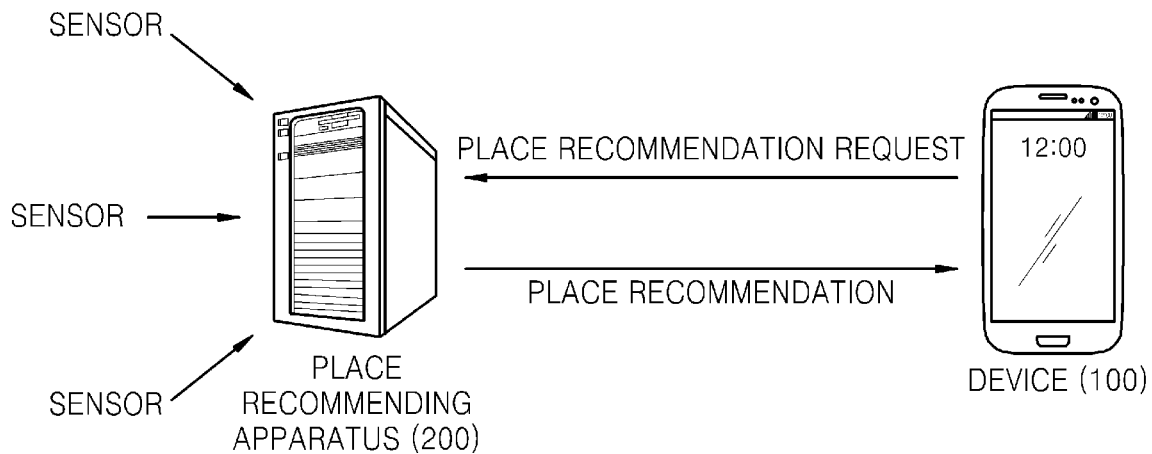
FIG. 1 is a diagram showing a system for recommending a place according to an embodiment.

Reference will now be made in detail to embodiments, examples of which are illustrated in the accompanying drawings, wherein like reference numerals refer to the like elements throughout. In this regard, embodiments may have different forms and should not be construed as being limited to the descriptions set forth herein. Accordingly, embodiments are merely described below, by referring to the figures, to explain aspects of the present disclosure. Expressions such as "at least one of," when preceding a list of elements, modify the entire list of elements and do not modify the individual elements of the list.

General terms widely used at present as possible by considering the functions in the present disclosure are selected as terms used herein, but may be changed according to purposes of those skilled in the art or customs or the appearance of new technologies. In a one or more embodiments, terms arbitrarily selected by an applicant may be used and these terms will be described in a relevant description part of the present disclosure. Therefore, the terms used herein may be understood on the basis of contents throughout this specification, not only upon names of the terms.

When a part "comprises" or "includes" an element, unless otherwise described, the part may further comprise or include other elements, rather than exclude other elements. Also, the terms, such as "unit" or "module" should be understood as a unit that processes at least one function or operation and that may be embodied in a hardware manner, a software manner, or a combination of the hardware manner and the software manner.

Herein, a Point of Interest (POI) refers to a particular position or place that is useful to a user or in which the user is interested. Thus, a request for recommendation of POI information refers to a request for a particular position or place that is useful to the user or in which the user is interested. Environment information according to the present disclosure refers to information regarding an environment, such as noise, brightness, temperature, or an air condition, in a particular place. The environment information according to an embodiment may refer to sensor data such as dB or ° C. and may be a character, a number, or a symbol that is interpretable as the environment information.

FIG. 1 is a showing a system for recommending a place (or a place recommending system) according to an embodiment.

As shown in FIG. 1, the place recommending system according to an embodiment may include a device 100 and a place recommending apparatus 200. However, all the shown components are not essential components. The place recommending system may be implemented by more components or less components than the shown components.

The device 100 according to an embodiment may send a POI information recommendation request including environment information to the place recommending apparatus 200, and receive POI information found based on the environment information from the place recommending apparatus 200.

The device 100 according to an embodiment may include one or more sensors and transmit sensor data obtained from the sensors to the place recommending apparatus 200.

The device 100 may include one or more sensors. For example, the device 100 may include a motion sensor including an accelerometer, a gravity sensor, a gyroscope, or a rotational vector sensor, an environmental sensor including a barometer, a photometer, or a thermometer, and a position sensor including an orientation sensor or a magnetometer. The device 100 may also include a Global Positioning System (GPS), a Radio-Frequency Identification (RFID), BLUETOOTH, a microphone, a touch screen, a proximity sensor, an illumination sensor, and a camera.

In the device 100 according to an embodiment, a Seamless Sensing Platform (SSP) may operate separately from an Application Processor (AP). The device 100 according to an embodiment collects sensing information and recognizes a situation by connecting sensors to a sensor hub of the SSP without waking up the AP in a sleep mode. The sensor hub (e.g., a type of Micro Control Unit (MCU)) of the SSP wakes up the AP in the sleep mode if a predetermined situation occurs. The SSP and the AP according to an embodiment may be implemented in the form of hardware (H/W), software (S/W), or a combination thereof (H/W+S/W).

The device 100 according to an embodiment may be implemented in various forms. For example, the device 100 described herein may be, but not limited to, a desktop computer, a cellular phone, a smart phone, a laptop computer, a tablet Personal Computer (PC), an electronic book terminal, a digital broadcasting terminal, a Personal Digital Assistant (PDA), a Portable Multimedia Player (PMP), a navigation system, an MP3 player, a digital camera, an Internet Protocol Television (IPTV), a Digital Television (DTV), or a CE device (for example, a refrigerator or an air conditioner having a display device).

The place recommending apparatus 200 according to an embodiment collects sensor data generated by a plurality of devices and establishes a database regarding environment information of various places by using the collected sensor data.

The place recommending apparatus 200 according to an embodiment receives a POI information recommendation request including user-desired environment information from the device 100, searches for a user's POI based on the received environment information, and transmits information regarding the found POI to the device 100.

The place recommending apparatus 200 may be a server and may include a plurality of servers having different functions. The place recommending apparatus 200 may also be a device for recommending a place to the device 100 and may include a plurality of devices.

The place recommending apparatus 200 may be divided into a device for collecting sensor data generated by a plurality of devices and establishing a database regarding environment information of various places and a device for searching for a place based on the environment information received from the device 100 and transmitting the found place to the device 100. Such devices may be implemented with different entities and they fall within the scope of the present disclosure.

Figure 2:
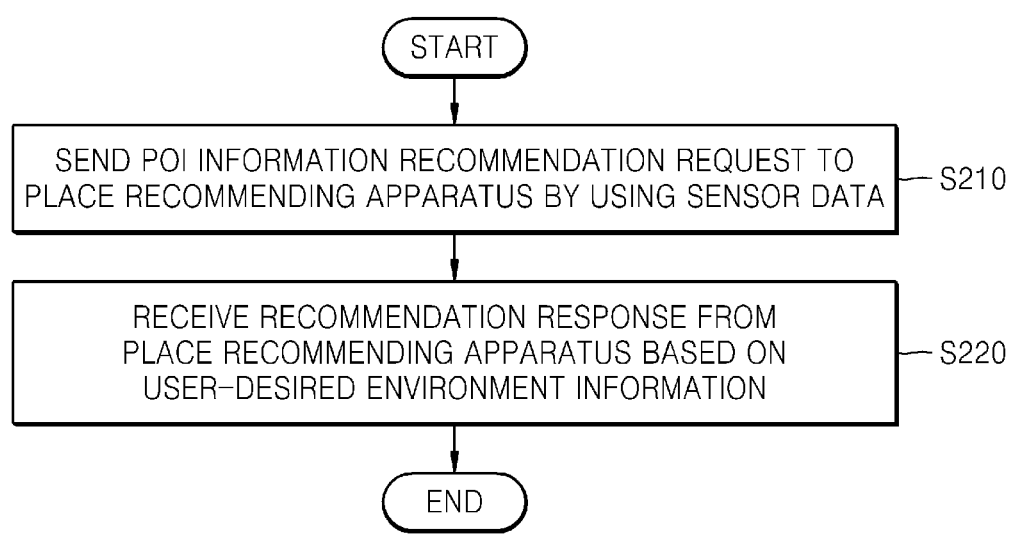
FIG. 2 is a flowchart showing a process in which a device sends a Point of Interest (POI) information recommendation request to an apparatus for recommending a place (or a place recommending apparatus) and receives a place recommendation from the place recommending apparatus, according to an embodiment.

FIG. 2 is a flowchart showing a process in which the device 100 sends POI information recommendation request to the place recommending apparatus 200 and receives a place recommendation from the place recommending apparatus 200, according to an embodiment.

In operation S210, the device 100 may send a POI information recommendation request to the place recommending apparatus 200 by using sensor data.

In other words, the device 100 may send a POI information recommendation request including user-desired environment information to the place recommending apparatus 200, which collects environment information related to a place in which sensor data is generated, by using the sensor data generated by at least one of a plurality of devices including the device 100. The device 100 may send a request for a place having a user-desired environment, that is, a request for POI information, to the place recommending apparatus 200.

To request a place having a user-desired environment, the device 100 may transmit information regarding the user-desired environment (or user-desired environment information) to the place recommending apparatus 200. The environment information transmitted by the device 100 may be a sensor value or may include a word interpretable with the sensor value. The environment information transmitted by the device 100 may be a user sensor profile stored in advance in the device 100. The user sensor profile may be a sensor profile previously generated in the device 100 through one or more times of sensor recognition.

The place recommending apparatus 200 to which the device 100 sends a place recommendation request may store environment information related to a plurality of places in a database.

The database for the environment information (or environment information database) stored in the place recommending apparatus 200 may be established using sensor data collected from at least one of a plurality of devices including the device 100. Environment information related to a place may be established using sensor data collected from one device or sensor data collected from a plurality of devices.

The device that transmits sensor information may be the device 100 that may send a place recommendation request to the place recommending apparatus 200, or may be a device that merely transmits the sensor data to the place recommending apparatus 200.

In operation S220, the device 100 receives a recommendation response to the POI information recommendation request from the place recommending apparatus 200, based on the user-desired environment information.

In other words, the device 100 may receive the recommendation response, which includes a place found based on the user-desired environment information, from the place recommending apparatus 200. The recommendation response may include environment information related to the found place.

Figure 3:
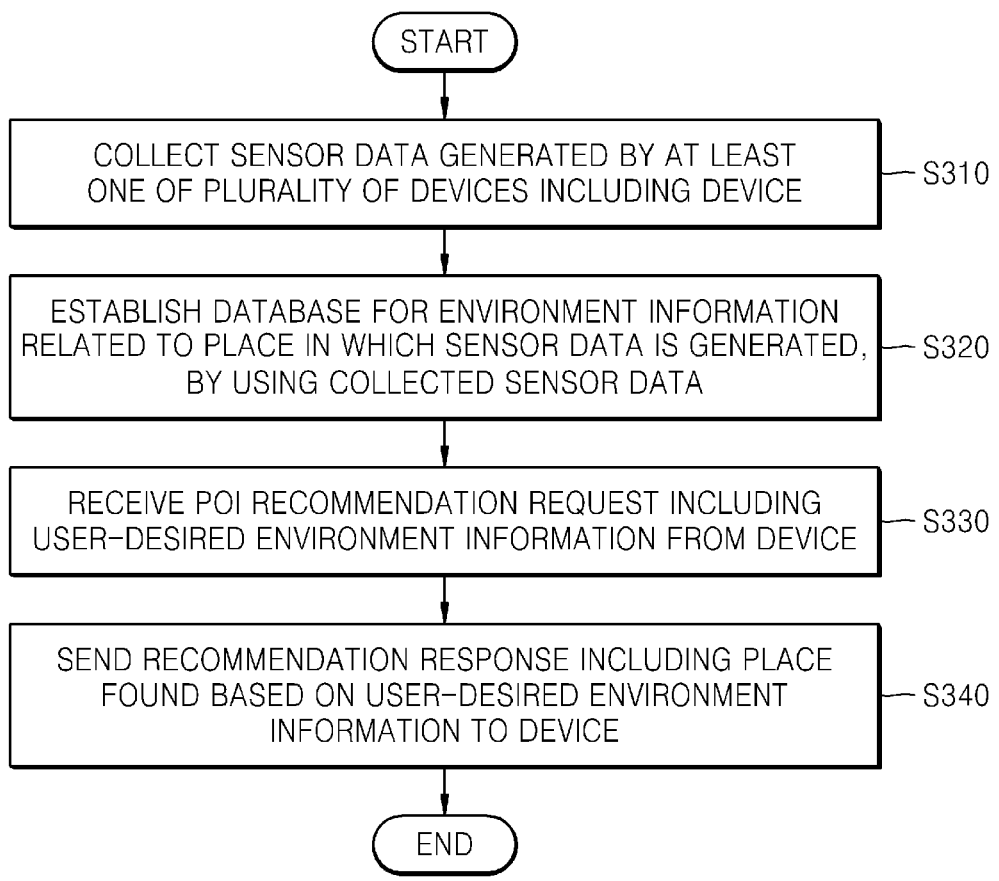
FIG. 3 is a flowchart showing a process in which a place recommending apparatus receives a POI information recommendation request from a device and recommends a place to the device, according to an embodiment.

FIG. 3 is a flowchart showing a process in which the place recommending apparatus 200 receives a POI information recommendation request from the device 100 and recommends a place to the device 100, according to an embodiment.

In operation S310, the place recommending apparatus 200 collects sensor data generated by at least one of a plurality of devices including the device 100. The place recommending apparatus 200 may collect sensor data from the device 100 that requests a place recommendation, or may collect sensor data from an arbitrary device.

In operation S320, by using the sensor data collected from the device 100, the place recommending apparatus 200 establishes a database for environment information related to a place where the sensor data is generated. That is, the place recommending apparatus 200 may generate a database for environment information related to each place. The place recommending apparatus 200 may store the collected sensor data or may convert the sensor data into a character or number and store the character or number.

In operation S330, the place recommending apparatus 200 receives a POI information recommendation request including user-desired environment information from the device 100.

In operation S340, the place recommending apparatus 200 sends a recommendation response to the POI information recommendation request, which includes a place found based on the environment information received from the device 100, to the device 100. The recommendation response may include environment information related to the found place.

Figure 4:
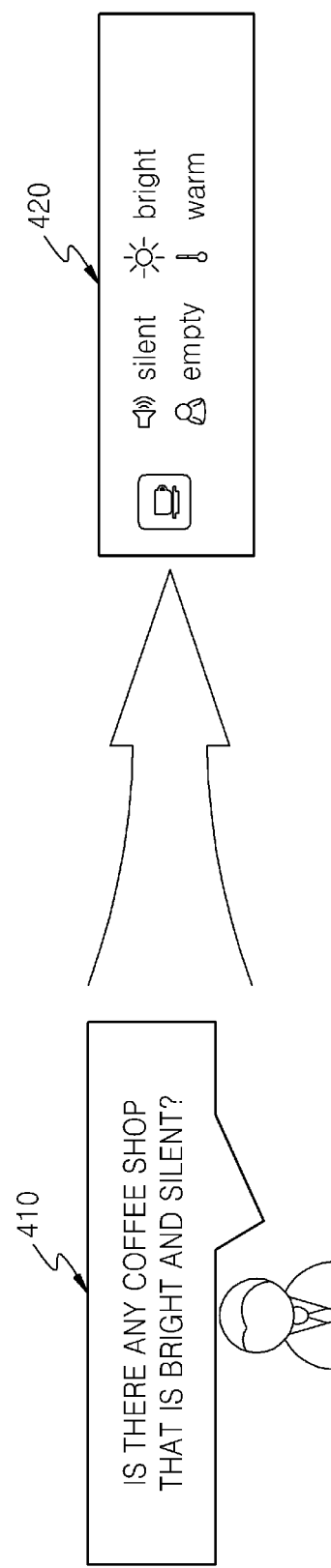
FIG. 4 is a diagram describing interpretation of user-desired environment information as sensor data, according to an embodiment.

FIG. 4 is a diagram describing interpretation of user-desired environment information as sensor data, according to an embodiment.

Table (A) of FIG. 4 shows that environment description phrases are converted into sensor data and sensor data is converted into environment description phrases according to an embodiment.

Environment description phrases that describe environments, such as words "bright", "silent", "cozy", and "sunny", may be converted into or interpreted as sensor data.

For example, "bright" may be converted into a brightness of 200 lux or 300 lux, "silent" may be interpreted as a noise level of 30 dB or 40 dB, "cozy" may be converted into a brightness of 100 lux-200 lux, a noise level of 30 dB-40 dB, a temperature of 23° C.-26° C., and a dust concentration of 30 $\mu g/m^3$-40 $\mu g/m^3$.

Through mutual conversion between environment description phrases and sensor data, an environment description phrase that describes user-desired environment information may be converted into sensor data and sensor data may be converted into an environment description phrase that describes an environment of a place.

For example, if user-desired environment information 410 is "a coffee shop in a bright and silent atmosphere", environment information "bright" and "silent" are environment description phrases and are converted into sensor data 420. Thus, a place corresponding to a brightness of 200 lux-300 lux and a noise level of 30 dB-40 dB or a similar environment may be recommended from among coffee shops.

Also, if sensor data of a particular coffee shop includes a brightness of 100 lux-200 lux, a noise level of 30 dB- to 40 dB, a temperature of 23° C.-26° C., and an air condition of 30 $\mu g/m^3$-40 $\mu g/m^3$, environment information of the coffee shop may include "bright", "silent", and "cozy".

Figure 5:
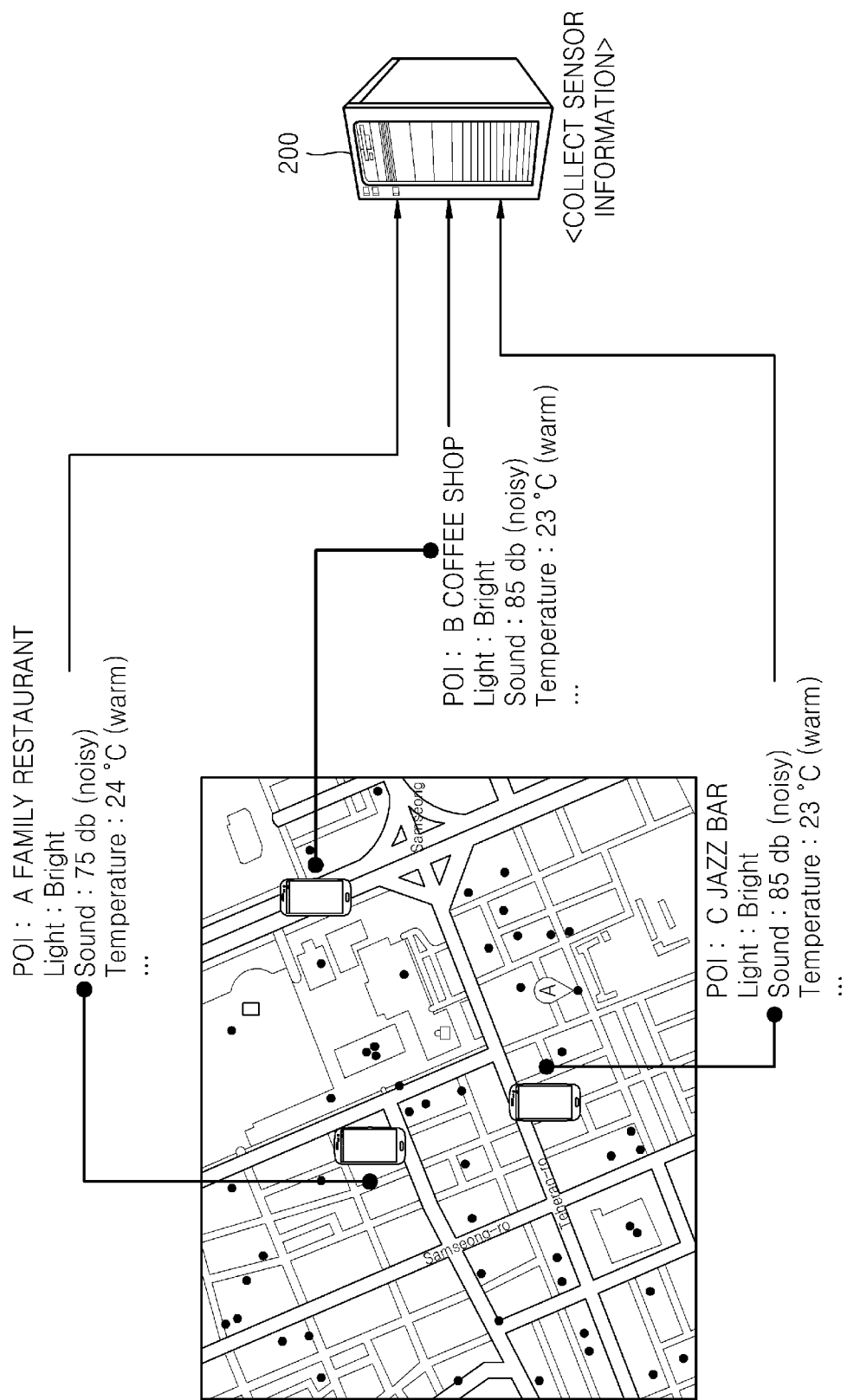
FIG. 5 is a diagram describing an example in which a place recommending apparatus establishes an environment information database regarding places by collecting sensor data, according to an embodiment.

FIG. 5 is diagram describing an example in which the place recommending apparatus 200 establishes an environment information database regarding places by collecting sensor data, according to an embodiment.

A device that transmits sensor information to the place recommending apparatus 200 may include at least one sensors. For example, the device may include at least one of a motion sensor, an environment sensor, and a position sensor.

The device that transmits sensor information to the place recommending apparatus 200 periodically uses a sensor to obtain sensor data regarding an environment. The device that transmits sensor information to the place recommending apparatus 200 may use a sensor upon occurrence of a predefined event, in a predefined situation, or in a predefined place, to obtain sensor data regarding an environment.

The device that transmits sensor information to the information recommending apparatus 200 may transmit the environment information regarding the environment, which is obtained from the sensor data, to the place recommending apparatus 200. The environment information transmitted from the device, which transmits the sensor information to the place recommending apparatus 200, to the place recommending apparatus 200 is environment information the device 100 obtains by sensing the environment, and may be in any form indicating the environment.

For example, the device may transmit the sensor data to the place recommending apparatus 200 and may convert the sensor data into environment description phrases that describe the environment and transmit the environment description phrases to the place recommending apparatus 200. The device may also convert the sensor data into a predefined sensor data level and transmit the predefined sensor data level to the place recommending apparatus 200. For example, a brightness of 10 lux-200 lux may be converted into Level 1 and a brightness of 200 lux-300 lux may be converted into Level 2 and they may be transmitted to the place recommending apparatus 200.

The device that transmits the sensor information to the place recommending apparatus 200 may periodically transmit environment information regarding an environment to the place recommending apparatus 200, or may transmit it to the place recommending apparatus 200 when a request or an approval is received from the user. The device that transmits the sensor information to the place recommending apparatus 200 may transmit environment information to the place recommending apparatus 200 upon occurrence of a predefined event or in a predefined situation. The device may also transmit the environment information to the place recommending apparatus 200 in a predefined place.

The device that transmits the sensor information to the place recommending apparatus 200 may transmit place or position information in which the device 100 situated, together with the environment information regarding the environment, to the place recommending apparatus 200. For example, position data using a GPS or information including a business name, a place name, and an address may be transmitted, but embodiments are not limited thereto.

The place recommending apparatus 200 receives environment information regarding an environment of one or more devices and position or place information regarding a position or a place in which the devices are situated, from the devices.

For example, the place recommending apparatus 200 sends an environment information request to one or more devices and receives environment information in response to the environment information request. The place recommending apparatus 200 may periodically receive environment information and position or place information from the devices.

The place recommending apparatus 200 establishes an environment information database regarding places based on environment information and position or place information received from the devices For example, in FIG. 5, sensor information, such as brightness, noise, and temperature, of a family restaurant A is received from a device located in the family restaurant A, such that a database may be established with such environment information related to the family restaurant A.

If plural environment information is received for the same place, the environment information may form a database with statistic values.

The place recommending apparatus 200 may form a database for variations of environment information related to the same place according to time, day, and date. By using the database, an environment of a place may be predicted based on time, day, and date.

The place recommending apparatus 200 may form a database for variations of environment information according to a user of the device that transmits sensor information. In this way, a user-desired environment may be derived and a user sensor profile may be generated.

The place recommending apparatus 200 may form a database for environment information related to places with sensor data, store environment description phrases describing environments as the environment information, and store predefined sensor data levels as the environment information.

The place recommending apparatus 200 may form a database for environment information related to places with maps. For example, environment information related to places may be stored in a map database to generate an environment information map and may be updated in real time.

The place recommending apparatus 200 interprets the environment information received from the device 100 and provides additional information regarding the places.

For example, by analyzing a noise pattern in a place, it may be determined whether the place is an office, a street, a stadium, or a car. Based on a noise level, a population density in a place may also be determined. Thus, a population density and the number of real-time empty seats in a place may be determined and transmitted to the device 100.

For example, by using brightness level and GPS information in a place, it may be determined whether the place is an indoor place or an outdoor place, and an average brightness level over time in the place may be calculated.

For example, a relative altitude in the same building may be predicted using pressure data in a place and a position in the building may be predicted using magnetic field information of the place. The amount of movement of the user in the place may also be measured using the amount of motion of the user. The amount of motion of the user may be analyzed for each place of a specific category to provide characteristics of the place. An average temperature of a place may be measured and provided to the device 100.

In this way, in one or more embodiments, environment information related to a place may be collected in real time. By forming a database for such environment information, an environment of a place may be predicted.

Figure 6:
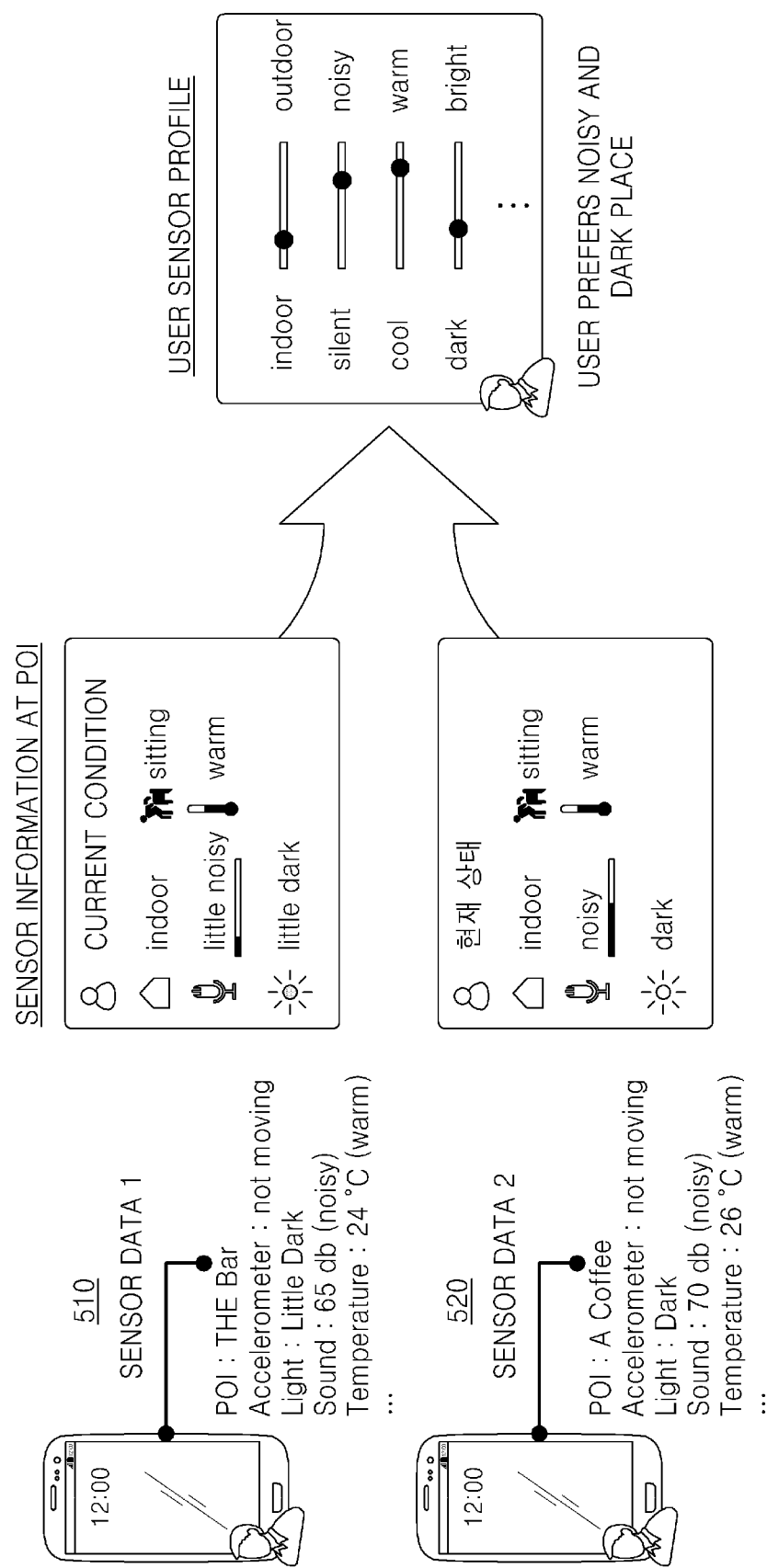
FIG. 6 is a diagram describing an example in which sensor profile information of a user is generated, according to an embodiment.

FIG. 6 is a diagram describing an example in which sensor profile information of a user (or user sensor profile information) is generated, according to an embodiment.

The user sensor profile information is information regarding an environment the user usually prefers. The user sensor profile information may be stored as sensor data, environment description phrases describing environments, or predefined sensor data levels.

By using the sensor data obtained in the device 100, the sensor profile information of the user of the device 100 may be generated. For example, the device 100 may obtain plural sensor data in various situations and generate user sensor profile information based on the obtained sensor data.

If the device 100 transmits user-desired environment information for requesting POI information recommendation to the place recommending apparatus 200, the user sensor profile information may be generated based on the environment information.

The user sensor profile information may be generated, respectively, for place, time, day, weather, and activity. The user sensor profile information may be stored in the device 100 or in the place recommending apparatus 200.

In FIG. 6, sensor data #1 510 and sensor data #2 520 have been collected from different places. By analyzing sensor information collected in respective places, environment information related to the respective places may be obtained and common environment characteristics among the places may be generated as user sensor profile information.

In an example shown in FIG. 6, sensor data obtained in Place 1 (The Bar) indicates a little-user-motion, indoor, noisy, and dark environment. Sensor data obtained in Place 2 (A Coffee) also indicates a little-user-motion, indoor, noisy, and dark environment. Thus, user sensor profile information may be generated as a profile indicating an indoor, noisy, and dark environment that is common between Place 1 and Place 2.

Figure 7:
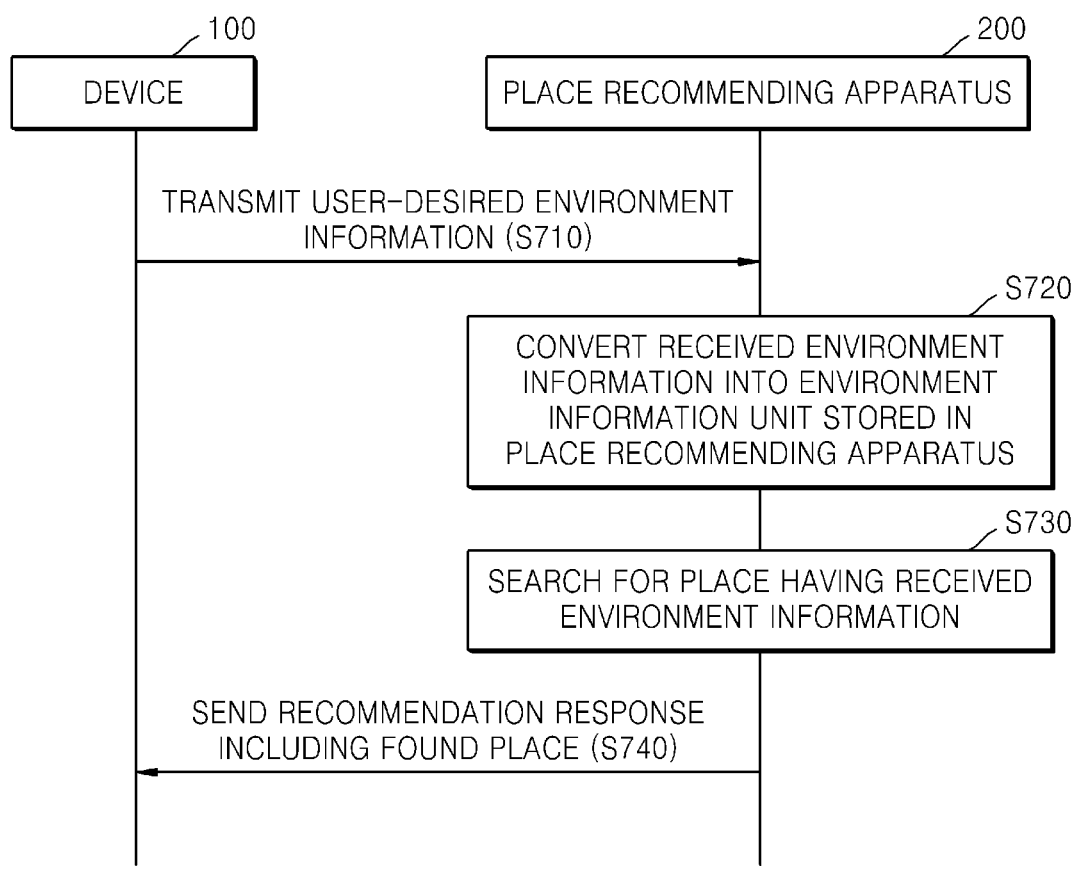
FIG. 7 is a ladder diagram describing a process in which a device transmits user-desired environment information to a place recommending apparatus to receive a place recommendation, according to an embodiment.

FIG. 7 a ladder diagram describing a process in which the device 100 transmits user-desired environment information to the place recommending apparatus 200 to receive a place recommendation, according to an embodiment.

In operation S710, the device 100 sends a POI information recommendation request including user-desired environment information to the place recommending apparatus 200. That is, the device 100 may send a POI information recommendation request including user-desired environment information to the place recommending apparatus 200 to receive a recommendation of a place having a user-desired environment.

The environment information transmitted to the place recommending apparatus 200 may be sensor data and may include an environment description phrase that describes an environment. The environment information may also be a search keyword for searching for a place or may be a predefined sensor data level.

The environment information received in the place recommending apparatus 200 may be information directly input to the device 100 from the user or may be previously stored user sensor profile information.

The POI information recommendation request may include not only the environment information, but also information, such as time, a place, user information, a schedule, or the like, based on which a place is searched for.

In operation S720, the place recommending apparatus 200 converts the received environment information into an environment information unit (environment informer) stored in the place recommending apparatus 200.

For example, if the received environment information is information including environment description phrases and environment information related to places, which may be found in the place recommending apparatus 200, is stored in the form of sensor data, the received environment description phrases may be converted into corresponding sensor category and sensor data range.

For example, if the received environment information is in the form of sensor data and environment information related to places, which may be found in the place recommending apparatus 200, is stored in the form of environment description phrases, the received sensor data may be converted into corresponding environment description phrases.

For example, if the received environment information is in the form of sensor data and environment information related to places, which may be found in the place recommending apparatus 200, is stored in the form of a predefined sensor data level, the received sensor data may be converted into a corresponding sensor level.

In operation S730, the place recommending apparatus 200 searches for a place having a user-desired environment, which is requested from the device 100.

The place recommending apparatus 200 may extract a place from a place database based on time, a place, and environment information received from the device 100.

The place database may store sensor data regarding places or may store environment information related to places as environment description phrases or sensor data levels.

The place database may store environment information related to places, and may include, but not limited to, a trip database, a communication life information database, a map database, and a location-based Social Network Service (SNS) database.

In operation S740, the place recommending apparatus 200 sends a recommendation response including the found place to the device 100.

The place recommending apparatus 200 may transmit environment information related to the found place, together with information regarding the found place.

Figure 8:
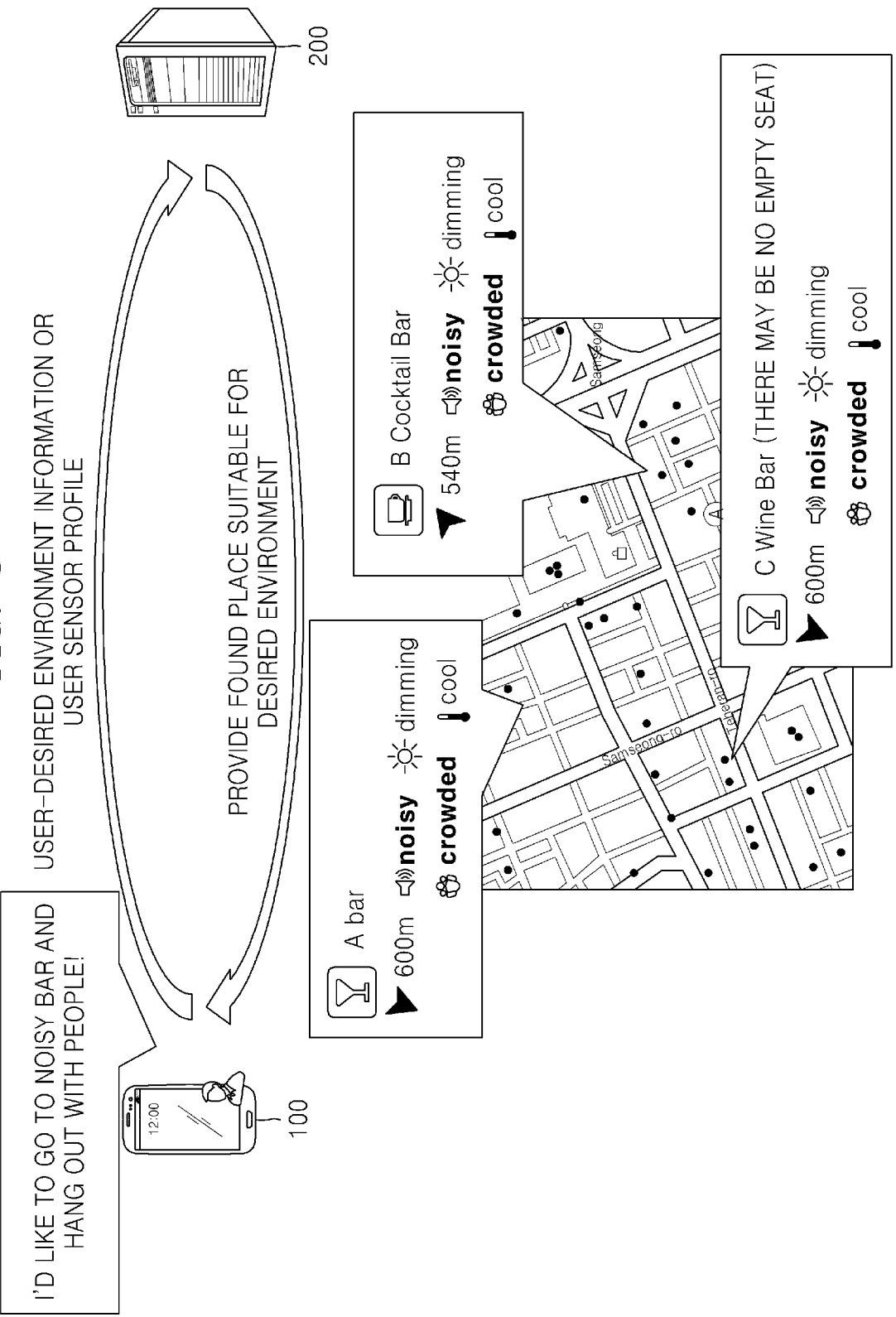
FIG. 8 is a diagram describing an example in which a device transmits user-desired environment information to a place recommending apparatus and receives a place recommendation, according to an embodiment.

FIG. 8 is a diagram describing an example in which the device 100 transmits user-desired environment information to the place recommending apparatus 200 and receives a place recommendation, according to an embodiment.

The device 100 transmits user-input environment information to the place recommending apparatus 200 to receive a place suitable for the environment information.

The device 100 may receive the user-desired environment information from the user in the form of sensor data, a text including environment description phrases, or a Graphic User Interface (GUI) control indicating a sensor value.

Even if the user does not directly input environment information to receive a place recommendation, the device 100 may analyze arbitrary user input information and recommend a place. For example, the device 100 may extract user-desired environment information from user's schedule, to-do-list, memo, Short Messaging Service (SMS), mail, or SNS application and recommend a place to the user.

If the device 100 receives environment information in the form of a text including environment description phrases from the user, the device 100 may extract the environment description phrases through context analysis with respect to the text. For example, if the user-input information is "a coffee shop in which quiet music is played", "quiet" and "music is played" may be extracted as environment description phrases and "coffee shop" may be extracted as a place.

If the user requests a POI information recommendation without inputting environment information, the device 100 may send a POI information recommendation request based on a previously stored user sensor profile to the place recommending apparatus 200.

The place recommending apparatus 200 may search for a place having a user-desired environment based on the environment information or user sensor profile information received from the device 100 and may send a recommendation response including the found place to the device 100.

The place recommending apparatus 200 may transmit environment information related to the found place, together with the found place. The place recommending apparatus 200 may interpret the environment information related to the found place and transmit additional information regarding the found place to the device 100.

Referring to FIG. 8, it is assumed that user-desired environment information is "nosy" and a user-desired place is "Bar". The device 100 may send a POI information recommendation request including the environment information to the place recommending apparatus 200, and the place recommending apparatus 200 may transmit environment information related to the found place, including noise, brightness, emptiness, temperature, and so forth, and information regarding the found place, such as a category, a business name, a distance from the user, a position on a map, and so forth, to the device 100.

In this way, in one or more embodiments, the user may recognize environment information related to a place without visiting the place and may know the environment information related to the place in real time. In addition, by analyzing user's intention and extracting user-desired environment information, a place having an environment suitable for a user's situation may be recommended. Moreover, a place may be recommended to the user based on current environment information related to the place, rather than past environment information related to the place.

Figure 9:
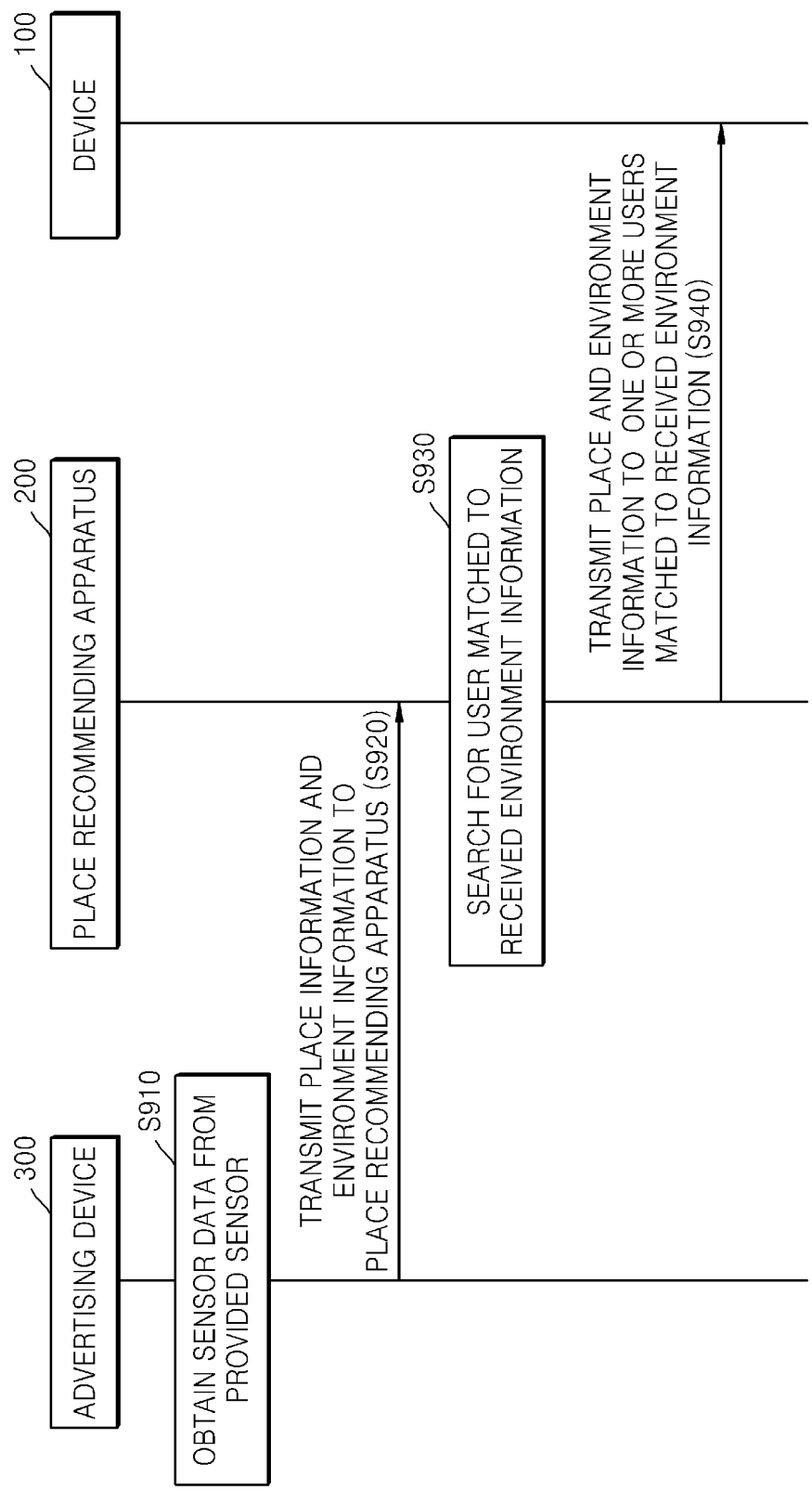
FIG. 9 is a ladder diagram showing an example in which an advertising device advertises environment information related to a place to a device by using sensor data, according to an embodiment.

FIG. 9 is a ladder diagram showing an example in which an advertising device 300 advertises environment information related to a place to the device 100 by using sensor data, according to an embodiment.

In operation S910, the advertising device 300 is a device located in a place to be advertised, and obtains sensor data regarding an environment. The advertising device 300 may be the device 100 that sends a POI information recommendation request to the place recommending apparatus 200 or a device that transmits sensor data to the place recommending apparatus 200 to advertise the place.

In operation S920, the advertising device 300 periodically transmits place information and environment information to the place recommending apparatus 200.

In operation S930, the place recommending apparatus 200 searches for a user matched to the environment information received from the advertising device 300. For example, the place recommending apparatus 200 may search for a user having sensor profile information matched to the environment information received from the advertising device 300. The place recommending apparatus 200 may also search for the device 100 that requests a place having the environment information received from the advertising device 300.

In operation S940, the place recommending apparatus 200 transmits the place to be advertised and environment information related to the place to the user found in operation S930.

Figure 10:
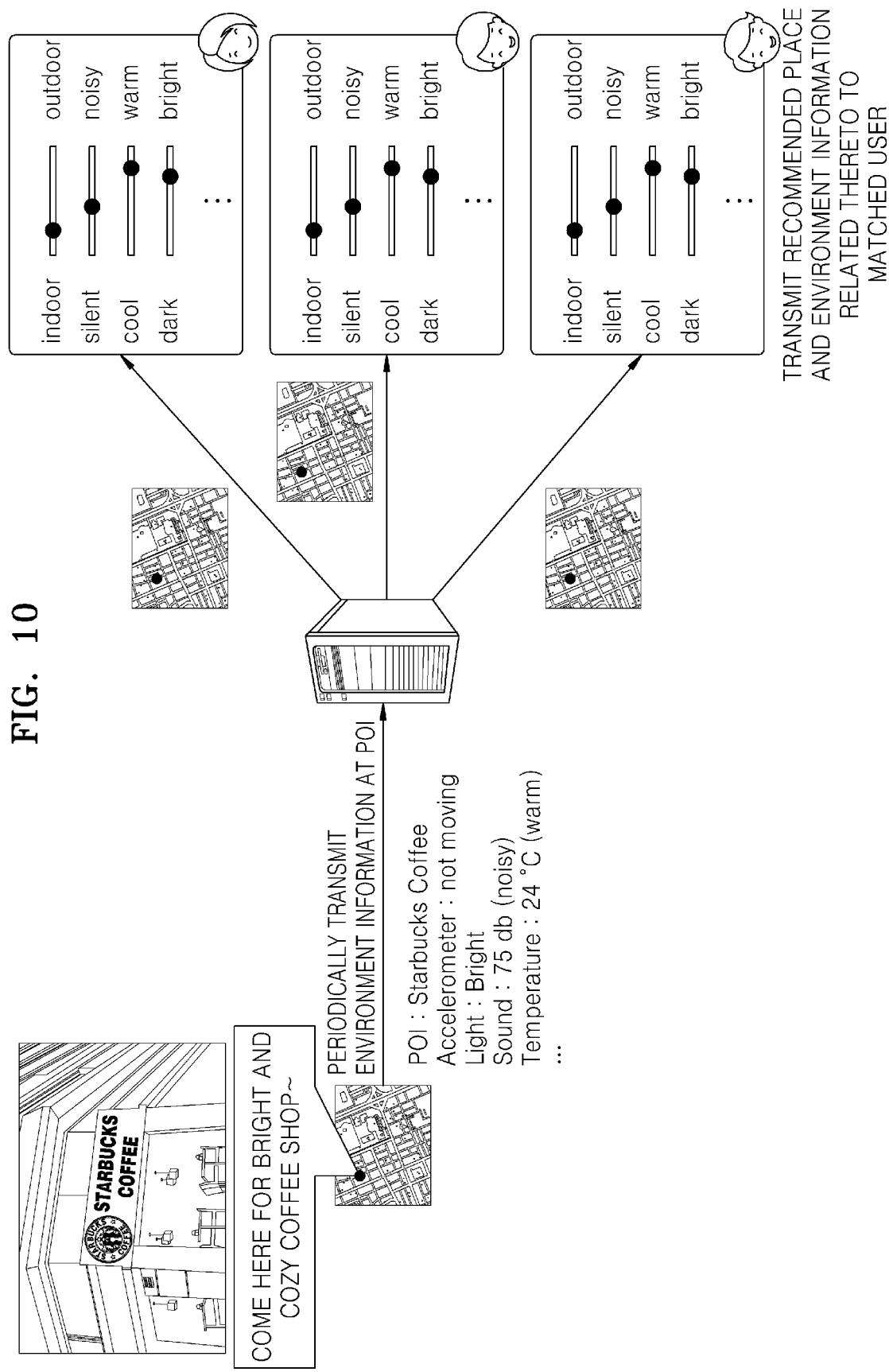
FIG. 10 is a diagram describing an example in which an advertising device advertises environment information related to a place to a device by using sensor data, according to an embodiment.

FIG. 10 is a diagram describing an example in which the advertising device 300 advertises environment information related to a place to the device 100 by using sensor data, according to an embodiment.

In FIG. 10, a place to be advertised is "Starbucks Coffee". The advertising device 300 located in this place obtains sensor data regarding an environment by using sensors. The advertising device 300 sends a place advertisement request including environment information related to the place to the place recommending apparatus 200. The advertising device 300 may periodically obtain sensor data regarding the environment and periodically send a place advertisement request including environment information to the place recommending apparatus 200.

The place recommending apparatus 200 receives a place advertisement request including environment information related to a place from the place advertising device 100.

The place recommending apparatus 200 transmits place information and environment information to a user who is matched to the received environment information, that is, who has environment information related to a place as sensor profile information, or a user who requests a recommendation of a place matched to environment information related to a place to be advertised.

The place recommending apparatus 200 also analyzes environment information related to a place and transmits additional information regarding an environment of the place. For example, a noise level or a noise pattern may be analyzed to transmit in real time a possibility of existence of an empty seat, and if it is determined that there is no empty seat, an advertising notification may be discontinued.

In this way, in an embodiment, a place may be advertised in real time to a plurality of users who desire a place having a particular environment.

Figure 11:
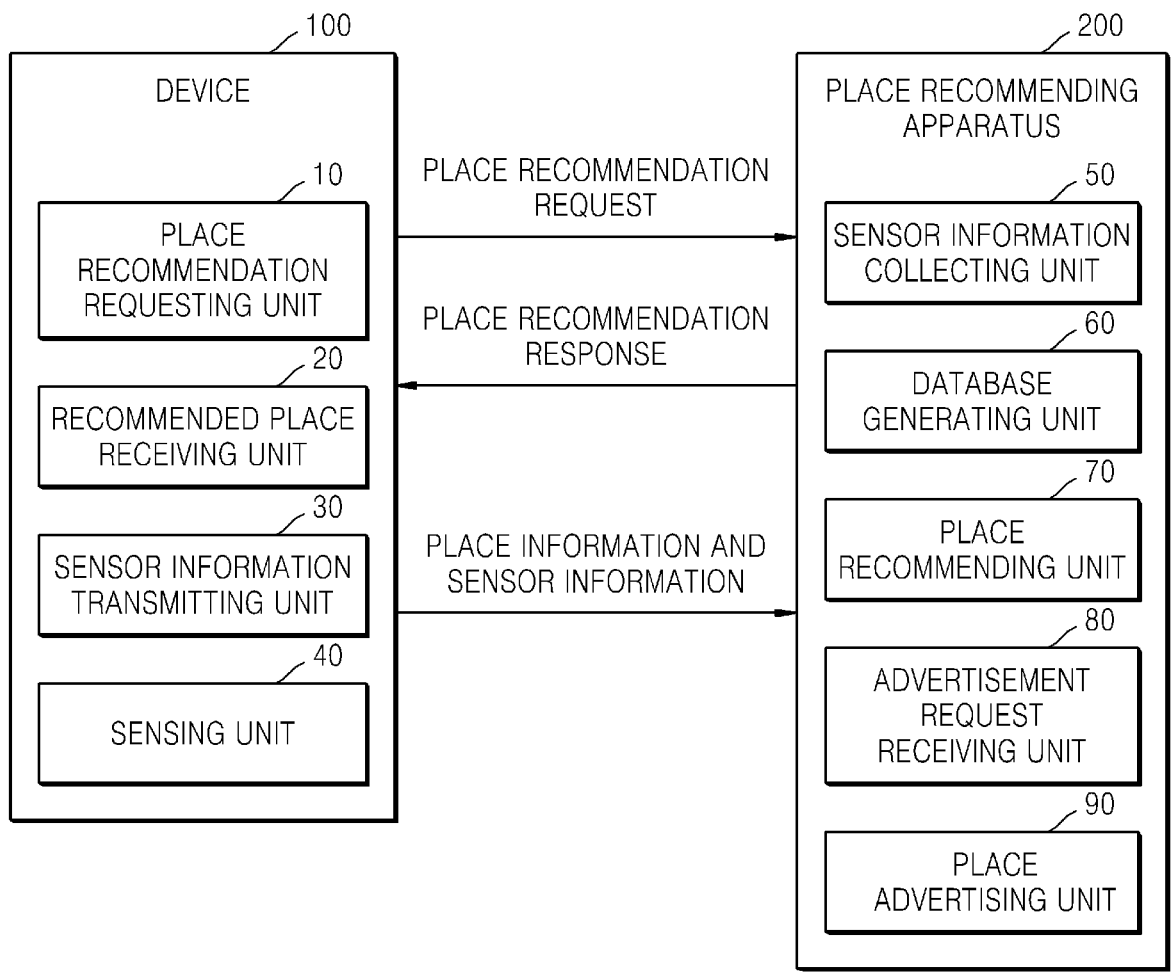
FIG. 11 is a block diagram showing a device and a place recommending apparatus for recommending a place by using sensor data according to an embodiment.

FIG. 11 is a block diagram showing the device 100 and the place recommending apparatus 200 for recommending a place by using sensor data according to an embodiment.

The device 100 may include a place recommendation requesting unit (place recommendation requester) 10, a recommended place receiving unit (recommended place receiver) 20, a sensor information transmitting unit (sensor information transmitter) 30, and a sensing unit (sensor) 40.

The place recommendation requesting unit 10 sends a POI information recommendation request to the place recommending apparatus 200 by using sensor data.

In other words, by using sensor data generated by at least one of a plurality of devices including a device, the place recommendation requesting unit 10 may send a POI information recommendation request including user-desired environment information to the place recommending apparatus 200 that collets environment information related to a place in which the sensor data is generated.

The place recommendation requesting unit 10 sends a request for recommendation of a place having user-desired environment information to the place recommending apparatus 200.

The recommended place receiving unit 20 receives a recommendation response to the POI information recommendation request to the place recommending apparatus 200, based on the user-desired environment information.

In other words, the recommended place receiving unit 20 may receive the recommendation response, which includes the place found based on the user-desired environment information, from the place recommending apparatus 200.

The recommended place receiving unit 20 may receive the recommended place found based on the user-desired environment information from the place recommending apparatus 200.

The environment information may include at least one of noise, brightness, temperature, and an air condition, and the environment information may be user sensor profile information previously stored in the device 100.

The sensing unit 40 obtains sensor information from one or more sensors. The sensor may be a sensor provided in the device 100 and may be an external device connected through wired/wireless communication. The sensor may be a motion sensor including an accelerometer, a gravity sensor, a gyroscope, or a rotational vector sensor, an environmental sensor including a barometer, a photometer, or a thermometer, or a position sensor including an orientation sensor or a magnetometer.

The sensor information transmitting unit 30 transmits the sensor information obtained by the sensing unit 40 to the place recommending apparatus 200.

The place recommending apparatus 200 may include a sensor information collecting unit (sensor information collector) 50, a database generating unit (data base generator) 60, a place recommending unit (place recommender) 70, an advertisement request receiving unit (advertisement request receiver) 80, and a place advertising unit place advertiser 90.

The sensor information collecting unit 50 collects sensor data generated by at least one of a plurality of devices including the device 100.

The sensor information collecting unit 50 collects sensor data through a plurality of devices.

The database generating unit 60 establishes a database for environment information related to a place in which the collected sensor data is generated, by using the collected sensor data.

The place recommending unit 70 receives a POI information recommendation request including user-desired environment information from the device 100. The place recommending unit 70 may send a recommendation response including a recommended place found based on the user-desired environment information to the device 100. The recommendation response may include environment information related to the recommended place.

The POI information recommendation request may include user identification information and the environment information may be user sensor profile information obtained using the user identification information.

The advertisement request receiving unit 80 receives an advertisement request including place information regarding a place in which the advertising device 300 is located and information regarding an environment of the advertising device 300, which is obtained from the sensor, from the advertising device 300.

The place advertising unit 90 transmits place information and environment information to at least one devices having sensor profile information matched to the environment information.

Processes, functions, methods, and/or software in apparatuses described herein may be recorded, stored, or fixed in one or more non-transitory computer-readable storage media (computer readable recording media) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of receiving, by a first device, a recommendation of Point of Interest (POI) information from a place recommending apparatus, the method comprising:
   obtaining sensor data, by at least one processor, from one or more sensors;
   transmitting the sensor data obtained from the one or more sensors and place information of the first device, to the place recommending apparatus;
   transmitting, by the at least one processor, to the place recommending apparatus, a POI information recommendation request including ambient environment information, of a potential location, desired by a user;
   receiving, by the at least one processor, from the place recommending apparatus, the recommendation of the POI in response to the transmitted POI information recommendation request based on the transmitted ambient environment information and sensor data of ambient environment information associated with a location from a plurality of places that is collected by the place recommending apparatus; and
   providing, by the at least one processor, the recommendation for the user to recognize environment information related to the POI without visiting the POI and know the environment information related to the POI in real time based on current ambient environment information associated with the POI.

2. The method of claim 1, wherein the environment information comprises at least one of noise, brightness, a temperature, and an air condition.

3. The method of claim 1, wherein the recommendation response further comprises environment information related to a found place.

4. The method of claim 1, wherein the environment information comprises a word that is interpretable based on sensor data.

5. The method of claim 1, wherein the environment information is a user sensor profile, which is stored in advance in the first device.

6. The method of claim 5, wherein the user sensor profile is a sensor profile that is generated in advance through one or more times of sensor recognition.

7. The method of claim 1, wherein:
   the transmitting of the POI information recommendation request to the place recommending apparatus comprises transmitting the POI information recommendation request including the user-desired environment information to the place recommending apparatus that collects environment information related to a place in which sensor data is generated, by using the sensor data generated by at least one of a plurality of devices, and
   the receiving of the recommendation response from the place recommending apparatus based on the user-desired environment information comprises receiving the recommendation response, which includes a place found based on the user-desired environment information, from the place recommending apparatus.

8. A method comprising:
   collecting, by at least one processor, sensor data, obtained from one or more sensors, and location information from at least one of a plurality of devices;

establishing, by the at least one processor, a database for the ambient environment information, by using the collected sensor data and location information;
receiving, by the at least one processor, a Point of Interest (POI) information recommendation request including user-desired ambient environment information of a potential location;
generating, by the at least one processor, a recommendation of a place among the plurality of places in response to the transmitted POI information recommendation request based on the received user-desired ambient environment information of the potential location and the database for the ambient environment information; and
transmitting the recommendation response for the user to recognize environment information related to the POI without visiting the POI and know the environment information related to the POI in real time based on current ambient environment information associated with the POI.

9. The method of claim 8, wherein the environment information comprises at least one of noise, brightness, a temperature, and an air condition.

10. The method of claim 8, wherein the recommendation response further comprises environment information related to the found place.

11. The method of claim 8, wherein the environment information comprises a word that is interpretable based on sensor data.

12. The method of claim 8, wherein the POI information recommendation request includes user identification information, and the user-desired environment information is a user sensor profile, which is obtained using the user identification information.

13. The method of claim 8, wherein the POI information recommendation request includes user identification information, and the method further comprises updating the user-desired environment information with the user sensor profile.

14. The method of claim 8, further comprising:
receiving an advertisement request including place information regarding a place in which an advertising device is located and environment information regarding vicinities of the advertising device from the advertising device;
searching for a sensor profile matched to the environment information; and
transmitting the place information and the environment information to a device of a user who has the sensor profile from among the at least one of the plurality of devices.

15. A first device for receiving a recommendation of Point of Interest (POI) information from a place recommending apparatus, the first device comprising:
a communicator;
one or more sensors; and
at least one processor coupled with the communicator and one or more sensors and configured to:
obtain sensor data from the one or more sensors,
transmit the sensor data obtained from the one or more sensors and place information of the first device to the place recommending apparatus,
transmit a POI information recommendation request including ambient environment information, of a potential location, desired by a user;
receive the recommendation of the POI in response to the transmitted POI information recommendation request based on the transmitted ambient environment information and sensor data of ambient environment information associated with a location from a plurality of places that is collected by the place recommending apparatus; and
provide the recommendation for the user to recognize environment information related to the POI without visiting the POI and know the environment information related to the POI in real time based on current ambient environment information associated with the POI.

16. The first device of claim 15, wherein the environment information comprises at least one of noise, brightness, a temperature, and an air condition.

17. The first device of claim 15, wherein the recommendation response further comprises environment information related to a found place.

18. The first device of claim 15, wherein:
the place recommendation requester transmits the POI information recommendation request including user-desired environment information to the place recommending apparatus that collects environment information related to a place in which the sensor data is generated, by using the sensor data generated by at least one of a plurality of devices which includes the first device, and
the recommended place receiver which receives a recommendation response to the POI information recommendation request, which includes a place found based on the user-desired environment information, from the place recommending apparatus.

19. A place recommending apparatus comprising:
a communicator; and
at least one processor coupled with the communicator and configured to:
collect sensor data, obtained from one or more sensors, and location information from at least one of a plurality of devices;
establish a database for the ambient environment information, by using the collected sensor data;
receive a Point of Interest (POI) information recommendation request including user-desired ambient environment information of a potential location,
generate a recommendation of a place among the plurality of places in response to the transmitted POI information recommendation request based on the received user-desired ambient environment information of the potential location and the database for the ambient environment information; and
transmit the recommendation response for the user to recognize environment information related to the POI without visiting the POI and know the environment information related to the POI in real time based on current ambient environment information associated with the POI.

20. The place recommending apparatus of claim 19, wherein the recommendation response further comprises environment information related to a found place.

21. The place recommending apparatus of claim 19, wherein the POI information recommendation request comprises user identification information, and the user-desired environment information is the user-desired environment information is a user sensor profile, which is obtained using the user identification information.

22. The place recommending apparatus of claim 19, wherein the at least one processor is further configured to:

receive an advertisement request including place information regarding a place in which an advertising device is located and environment information regarding vicinities of the advertising device from the advertising device; and transmit the place information and the environment information to at least one of the devices having sensor profiles matched to the environment information from among the at least one of the plurality of devices.

23. At least one non-transitory computer readable medium storing computer readable instructions which, when executed by a processor of a device, causes the processor to control the device to perform operations comprising:

obtaining sensor data, by at least one processor, from one or more sensors;

transmitting the sensor data obtained from one or more sensors and place information of the first device to the place recommending apparatus;

transmitting, by at least one processor, to the place recommending apparatus, a POI information recommendation request including ambient environment information, of a potential location, desired by a user;

receiving, by the at least one processor, from the place recommending apparatus, the recommendation of the POI in response to the transmitted POI information recommendation request based on the transmitted ambient environment information and sensor data of ambient environment information associated with a location from a plurality of places that is collected by the place recommending apparatus; and providing, by the at least one processor, the recommendation for the user to recognize environment information related to the POI without visiting the POI and know the environment information related to the POI in real time based on current ambient environment information associated with the POI.

24. At least one non-transitory computer readable medium storing computer readable instructions which, when executed by a processor of a device, causes the processor to control the device to perform operations comprising:

collecting, by at least one processor, sensor data, obtained from one or more sensors, and location information from at least one of a plurality of devices;

establishing, by the at least one processor, a database for ambient environment information, by using the collected sensor data and location information;

receiving, by the at least one processor, a Point of Interest (POI) information recommendation request including user-desired ambient environment information of a potential location;

generating, by the at least one processor, a recommendation of a place among the plurality of places in response to the transmitted POI information recommendation request based on the received user-desired ambient environment information of the potential location and the database for the ambient environment information; and transmitting the recommendation response for the user to recognize environment information related to the POI without visiting the POI and know the environment information related to the POI in real time based on current ambient environment information associated with the POI.

* * * * *